United States Patent [19]

Kawamoto

[11] 4,329,887

[45] May 18, 1982

[54] TRANSMISSION FOR AN AUTOMOBILE

[75] Inventor: Tamio Kawamoto, Sagamihara, Japan

[73] Assignee: Nissan Motor Co., Ltd., Yokohama, Japan

[21] Appl. No.: 118,730

[22] Filed: Feb. 5, 1980

[30] Foreign Application Priority Data

Feb. 7, 1979 [JP] Japan .................................. 54-13510

[51] Int. Cl.³ .......................... F16H 57/04; F16N 7/26
[52] U.S. Cl. ...................................... 74/467; 184/6.12
[58] Field of Search ..................... 74/467; 184/6, 6.12, 184/8, 9, 11 R, 11 A

[56] References Cited

U.S. PATENT DOCUMENTS

| | | | |
|---|---|---|---|
| 1,429,466 | 9/1922 | Turnbull | 74/467 |
| 2,258,077 | 10/1941 | Taylor | 184/6.12 |
| 2,590,870 | 4/1952 | Keese | 184/6.12 |

FOREIGN PATENT DOCUMENTS

| | | | |
|---|---|---|---|
| 607313 | 12/1934 | Fed. Rep. of Germany | 184/6.12 |
| 748665 | 11/1944 | Fed. Rep. of Germany | . |
| 2421235 | 11/1975 | Fed. Rep. of Germany | . |
| 133845 | 1/1979 | Fed. Rep. of Germany | 74/467 |
| 574119 | 1/1944 | United Kingdom | 184/6.12 |
| 696061 | 8/1953 | United Kingdom | . |
| 810411 | 3/1959 | United Kingdom | . |
| 926644 | 3/1962 | United Kingdom | 184/11 R |
| 1294686 | 11/1972 | United Kingdom | . |

*Primary Examiner*—Lawrence J. Staab
*Attorney, Agent, or Firm*—Thompson, Birch, Gauthier & Samuels

[57] ABSTRACT

A transmission for automobiles including a hollow control shaft for changing speeds in response to actuation of a control lever, through which hollow control shaft lubricating oil is distributed to different parts of the transmission.

1 Claim, 5 Drawing Figures

TRANSMISSION FOR AN AUTOMOBILE

BACKGROUND OF THE INVENTION

1. Field of the Invention

This invention relates to a transmission for an automobile, and more particularly to a transmission for an automobile which has an improved lubricating mechanism for a case extension bush, gears and gear bearings.

2. Description of the Prior Art

Lubricating oil must be constantly provided to certain parts of a transmission, such as that portion of a case extension bush which journals a drive shaft. A conventional structure for providing lubricating oil to such case extension bush comprises a conduit for guiding lubricating oil from an oil basin located in a gear case to an oil shelf formed at an upper portion of the case extension bush.

However, when the aforesaid conventional lubricating structure is used, a conduit must be formed in the case extension, resulting in an increased number of constituent parts and an increased number of steps for assembling work, so that the lubricating structure is economically unfavorable. In view of the need for reducing automobile size, the conventional lubricating structure using a large number of parts has another shortcoming in that the disposition of the lubricating parts in a limited small space causes restrictions in mounting positions and sizes of other parts.

SUMMARY OF THE INVENTION

The present invention is directed to obviating the aforesaid shortcomings of the prior art technique, and an object of the present invention is to provide a transmission for an automobile with a lubricating structure having a reduced number of parts, thereby enabling reductions in size and weight. To fulfill this objective, with a transmission for an automobile according to the present invention, a control shaft of the speed change gear is made hollow and lubricating oil is provided to the inside of the hollow control shaft, for delivering the lubricating oil through the control shaft, for instance, to a case extension bush.

BRIEF DESCRIPTION OF THE DRAWING

For a better understanding of the present invention, reference is made to the accompanying drawing, in which.

DESCRIPTION OF THE PREFERRED EMBODIMENTS

Figure 1:
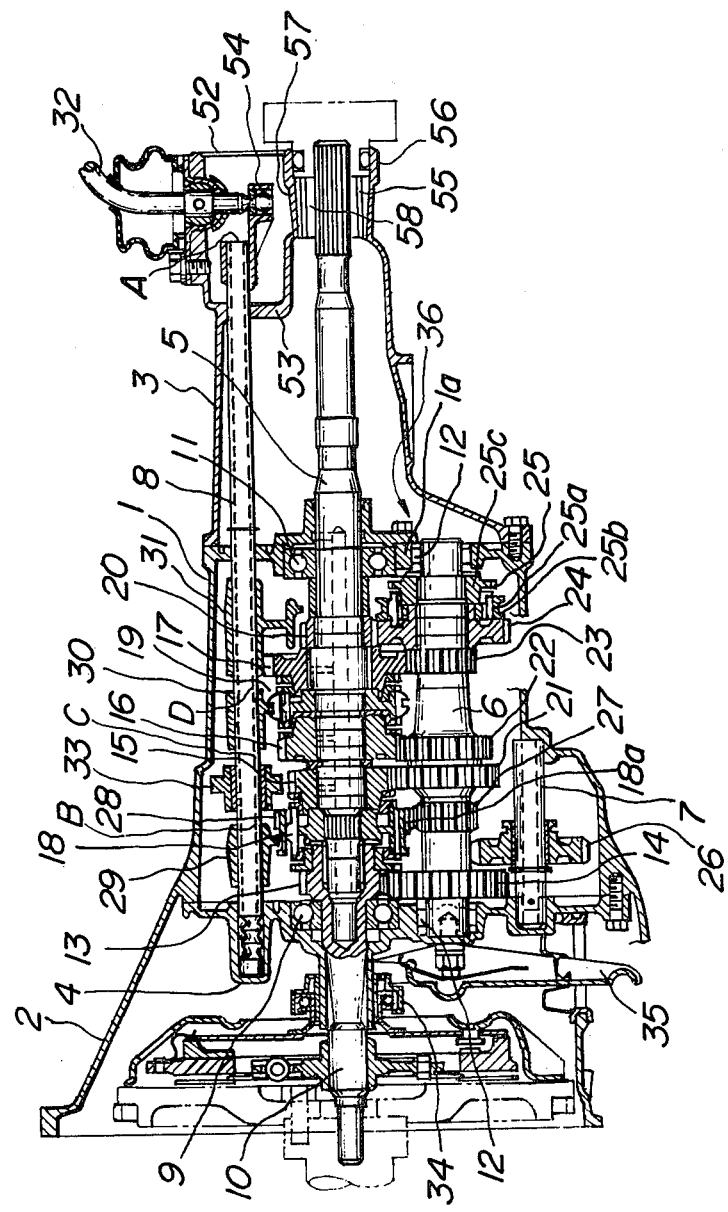
FIG. 1 is a schematic sectional view of a transmission according to the present invention.

Referring to FIG. 1 showing a schematic sectional view of a transmission according to the present invention, 1 is a gear case with a clutch housing 2 integrally formed therewith, 3 is a case extension which is separately formed from the gear case 1 and secured to the rear end of the gear case 1 by screws, and 4 is a front cover secured to the front portion of the gear case 1. A transmission case is formed by the gear case 1, the case extension 3 and the front cover 4. The gear housing or the transmission case carries at the inside thereof a main shaft 5, a counter shaft 6, an idle shaft 7, and a hollow control shaft 8 to be described hereinafter, which shafts are all jounaled in parallel with each other so as to extend in the longitudinal direction thereof.

The main shaft 5 has the front end thereof rotatably journaled by a rear hollow portion of a main drive shaft 10 held by the front cover 4 at a bearing 9, and the central portion of the main shaft 5 is held by a rear end wall 1a of the gear case 1 at a bearing 11, while the rear end of the main shaft 5 extends to the rear end of the case extension 3. The counter shaft 6 has front and rear ends thereof journaled by bearings 12 and 12 at the front cover 4 and the rear end wall 1a of the gear case 1, respectively. The idle shaft 7 has opposite ends thereof carried by the front cover 4 and a part of the gear case 1. The control shaft 8, a fork rod, extends from the gear case 1 to the case extension 3 and can rotate and shift about and along the longitudinal axis thereof within predetermined ranges.

The main drive shaft 10 is driven by an automobile engine through a clutch which is rotatably not shown, and the revolving power thereof is transmitted to the counter shaft 6 through a main drive gear 13 mounted at the rear end thereof and a counter gear 14 meshing with the gear 13. The main shaft 5 carries a third-speed gear 15, a second-speed gear 16 and a first-speed gear 17 mounted thereon in said order from the front end of the shaft. Synchronizing devices 18 and 19 are disposed between the aforesaid main drive gear 13 and third-speed gear 15 and between the aforesaid second-speed gear 16 and first-speed gear 17, respectively. In addition, an overdrive gear 20 is fixed at a position rearwardly next to the aforesaid first-speed gear 17.

On the other hand, the aforesaid counter shaft 6 carries a third gear 21, a second gear 22 and a first gear 23 integrally secured thereto, so as to mesh with the third-, second- and first-speed gears 15, 16, and 17, respectively. An OD gear 24 meshing with the aforesaid overdrive gear 20 is loosely fitted to the rear side of the first gear 23, and another synchronizing device 25 is disposed next thereto. More particularly, the synchronizing device 25 is constructed in such a manner that a synchronizing hub 25a is spline coupled with the OD gear 24 and a coupling sleeve 25b is rotatable relative to the shaft 6, while a clutch gear 25c is spline coupled with the shaft 6 so as to rotate together with the shaft.

The aforesaid idle shaft 7 has a reverse idle gear 26 loosely mounted thereon so as to be movable in the axial direction thereof, so that when it is moved to the right from the illustrated position, it simultaneously meshes with both an R gear 27 integrally formed with the aforesaid counter shaft 6 and a reverse gear 28 formed on the outer periphery of a coupling sleeve 18a of the aforesaid synchronizing device 18.

Furthermore, the aforesaid control shaft 8 has forks 29, 30, and 31 loosely mounted on a boss portion thereof, so as to correspond to the aforesaid synchronizing devices 18, 19, and 25, respectively. Each of such forks 29, 30, and 31 has end portions thereof disposed around the control shaft 8, so that when the control shaft 8 is axially rotated by a control lever 32, a shifter 33 integral therewith acts to select one of the forks for axially moving the selected fork in response to the axial movement of the control shaft 8. One end of a lever (not shown) journaled by the casing engages the aforesaid reverse idle gear 26, while the opposite end of that lever is disposed along with the end portions of the aforesaid forks, whereby during reverse operation, that lever is swung by the shifter for axially moving the reverse idle gear 26.

In the figure, 34 is a release bearing and 35 is a withdrawal lever.

Figure 2:
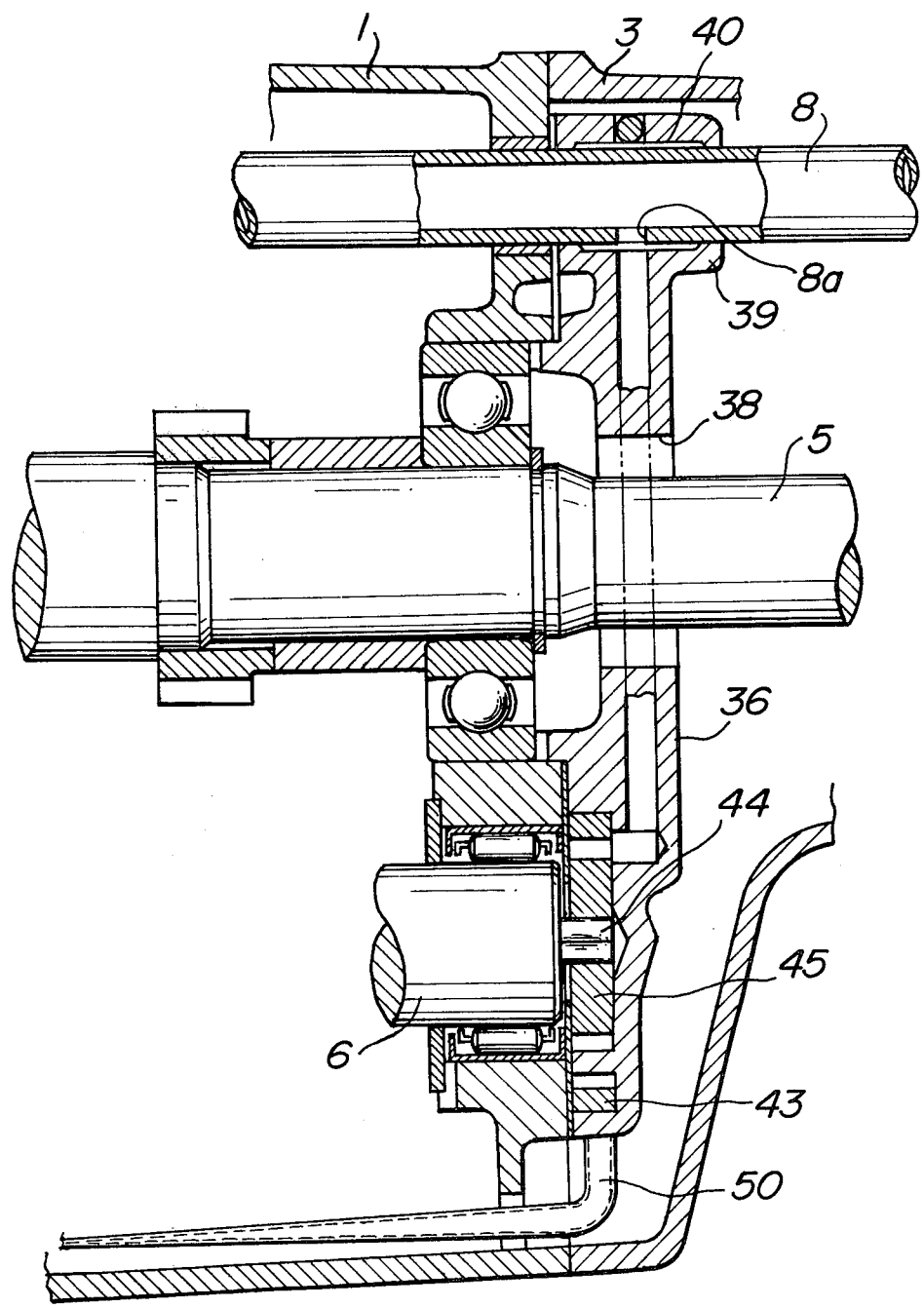
FIG. 2 is a sectional view of an essential portion of the present invention at a larger scale.
Figure 3:
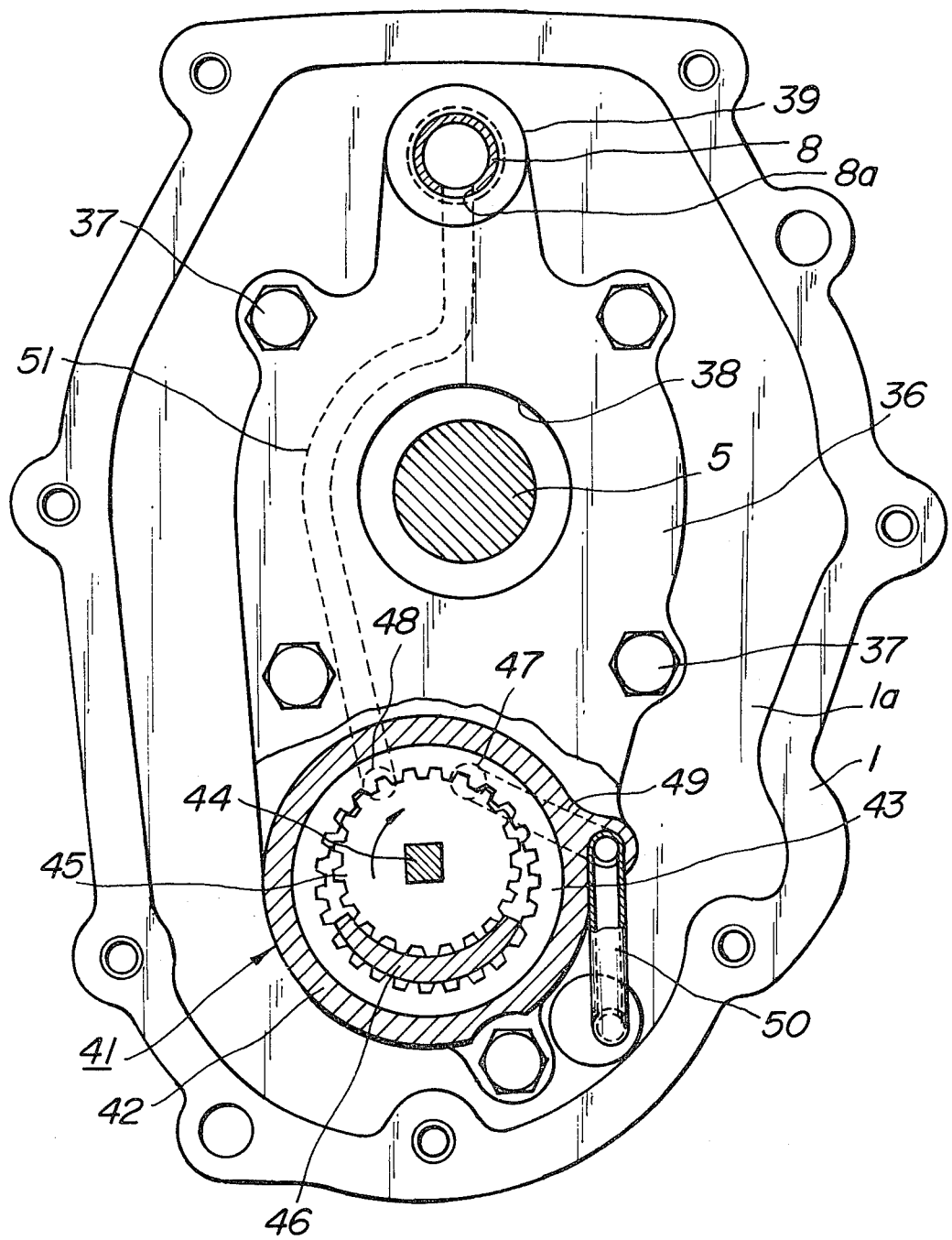
FIG. 3 is an elevation, with a part thereof shown in section, of an essential portion of the invention.

As shown in FIGS. 2 and 3, an oil guide housing 36 is fixed to the rear wall 1a of the gear case 1 on the surface thereof facing the case extension 3, by means of bolts 37. The oil guide housing 36 has an aperture 38 formed at the central portion thereof for allowing passage of the main shaft 5 therethrough and a boss portion 39 formed at the top end thereof for journaling the control shaft 8. An annular groove 40 for providing lubricating oil is formed on the inner peripheral surface of the boss portion 39. The width of the groove 40 is wider than the maximum axial moving distance of the control shaft, and the hollow control shaft 8 has an oil hole 8a facing the inside of the groove 40.

A gear pump means 41 is disposed below the oil guide housing 35. The gear pump means 41 comprises an annular internal gear 43 rotatably fitted in an annular wall 42 formed on one side of the oil guide housing 36 and a gear 45 secured to one end of the counter shaft 6 through a shaft 44. The gear 45 meshes with teeth of the internal gear 43 and the center of gear 75 is offset from the center of the internal gear 43. A crescent shaped partition wall 46 is integrally formed with the oil guide housing 36 so as to fit in a cresent space defined between the lower end of the gear 45 and the internal gear 43 in such a manner that the gear 45 engages the inner surface of the partition wall 46 while the internal gear 43 engages the outer surface of the partition wall 46.

The gear 45 meshes with the top portion of the internal gear 43, and a suction hole 47 for feeding lubricating oil opens toward a space on one side of the meshing point of the gears 43 and 45, i.e. toward a space before the meshing point as seen in the revolving direction of the gear 45, while a discharge hole 48 for discharging lubricating oil opens toward a space after the meshing point as seen from the same direction. The suction hole 47 and the discharge hole 48 are both bored on the inner surface of the oil guide housing 36.

The suction hole 47 communicates with an oil passage 49 formed in the oil guide housing 36 for connection with a piping 50, and the opposite end of the piping 50 is led to the inside of an oil basin at the lower portion of the gear case 1.

The discharge hole 48 communicates with one end of another oil passage 51 formed in the oil guide housing 36 while bypassing the central aperture 38, and the opposite end of the oil passage 51 opens at the groove 40 of the boss portion 39.

As can be seen from FIG. 1, the end of the hollow control shaft 8 on the side of the case extension 3 extends into a control lever housing 52 after penetrating through a partition wall 53 defining the housing 52 in a slidable fashion. The end of the shaft 8 in the housing 52 opens at a hole A, and a shifter bracket 54 connects the end portion of the control shaft 8 and the lower end of the control lever 32.

The bottom wall of the control lever housing 52 is integrally formed with a boss 56 of a case extension bush 55, and an oil shelf 57 is formed on the upper surface of the boss 56. An oil hole 58 is so formed as to extend from the oil shelf 57 to the case extension bush 55.

With the illustrated embodiment of the aforesaid construction, when the engine runs, the gear 45 is rotated by the normally revolving counter shaft 6, and the lubricating oil is sucked through the suction hole 47 by known action of the gear pump means 41 for delivery to the groove 40 at the boss 39 through the discharge hole 48 and the oil passage 51. The lubricating oil delivered to the groove 40 enters into the hollow space of the control shaft 8 through the oil hole 8a thereof and pours into the control lever housing 52 from the hole A at the end of the shaft 8, so that the lubricating oil is delivered to the case extension bush 55 through the oil shelf 57 and the oil hole 58. After lubricating the case extension bush 55, the lubricating oil returns to the gear case 1 by flowing along the bottom wall of the case extension 3.

Thus, there is provided a lubricating structure having a control shaft 8 made hollow for feeding lubricating oil to various parts to be lubricated through a gear pump 41 and an oil passage 51 of an oil guide housing 36, so that different parts conventionally required for lubrication can now be dispensed with and it is now possible to make parts which are lighter in weight and which have greater interchangeability.

It should be noted that the lubricating oil can be also fed to the gears for different speeds and to the synchronizing device and the like by providing oil holes, e.g. holes B, C, D of Fig. 1, on the intermediate portion of the control shaft 8 at positions where the hollow control shaft 8 faces the gears 15 through 17 of different speeds and the synchronizing device and the like. Furthermore, it is also possible to normally keep the lubricating oil in the hollow control shaft 8 by providing a weir of suitable height at the control lever side end of the control shaft 8.

Figure 4:
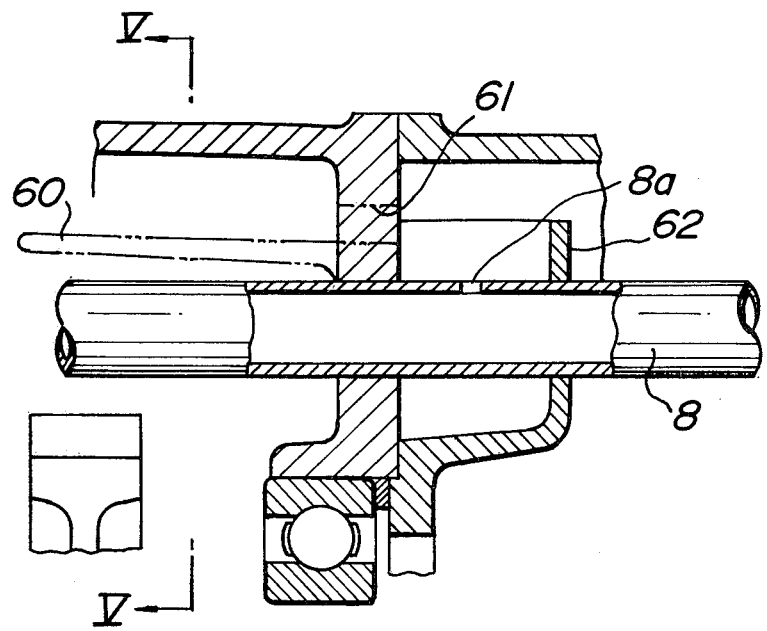
FIG. 4 is a sectional view of an essential portion in a different embodiment of the present invention.
Figure 5:
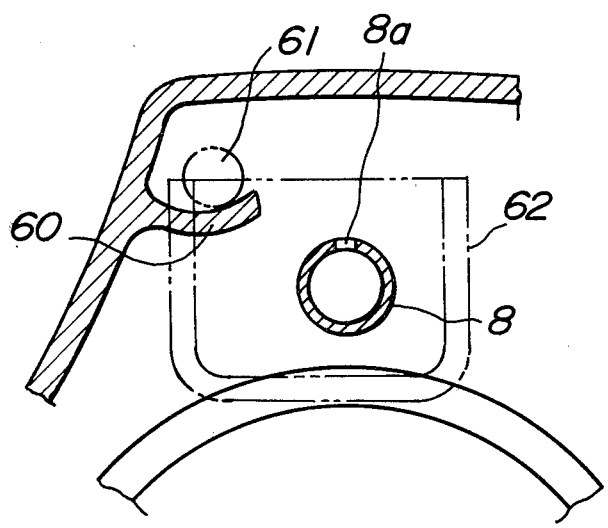
FIG. 5 is a sectional view taken along the line V—V of FIG. 4.

In the aforesaid embodiment, a gear pump means is used for providing the lubricating oil to the inside of the hollow control shaft 8, but the object of the present invention can be achieved by a construction of FIGS. 4 and 5, too. In the embodiment of FIGS. 4 and 5, an oil shelf 60 is formed at the upper portion of the gear case 1, and lubricating oil collected in the oil shelf 60 is led to an oil reservoir 62 through a hole 61 and further to the inside of the hollow control shaft 8 through the hole 8a.

As described in the aforegoing, with the present invention, the control shaft is made hollow for feeding lubricating oil to the inside of the control shaft, while one end of the control shaft or fork rod is so disposed as to face a case extension bush, whereby there is provided a transmission having a lubricating system which enables a reduction in the number of parts and a reduction in weight thereof through common use of parts.

What is claimed is:

1. In an automotive transmission wherein speed changes are effected by axially and rotationally adjusting a control shaft extending through a gear case, the improvement therein comprising: a lubricating oil reservoir surrounding the control shaft, a shelf in said gear case inclined toward said reservoir, said shelf being arranged to collect and deliver oil to said reservoir, an internal passageway extending axially through the control shaft, an inlet opening in the control shaft through which oil is received from said reservoir into said internal passageway, and outlets in the control shaft communicating with said internal passageway and through which oil is delivered at locations remote from said reservoir, the gear case having bearings journaling gears for different speeds and a case extension with a bush, the control shaft having one said outlet facing said case extension bush adapted to provide the lubricating oil from said internal passageway to said case extension bush, said one outlet for providing oil to said case extension bush being located at one end of the control shaft.

* * * * *